United States Patent [19]

Krude

[11] Patent Number: 4,529,254
[45] Date of Patent: Jul. 16, 1985

[54] WHEEL MOUNTING ASSEMBLY

[75] Inventor: Werner Krude, Siegburg-Kaldauen, Fed. Rep. of Germany

[73] Assignee: Uni-Cardan Aktiengesellschaft, Siegburg, Fed. Rep. of Germany

[21] Appl. No.: 475,909

[22] Filed: Mar. 16, 1983

[30] Foreign Application Priority Data

Mar. 17, 1982 [DE] Fed. Rep. of Germany ....... 3209690

[51] Int. Cl.³ ...................... B60K 17/30; F16C 33/00
[52] U.S. Cl. ............................... 301/124 R; 180/258; 180/259; 464/178; 464/906; 384/449
[58] Field of Search ............... 301/124 R, 124 H, 126, 301/125, 131; 180/259, 258, 70.1, 73.3, 73.4; 308/190, 191; 464/178, 906

[56] References Cited

U.S. PATENT DOCUMENTS

| 2,685,184 | 8/1954 | Nador et al. | 180/259 X |
| 3,295,626 | 1/1967 | Cadion | 180/48 |
| 3,879,960 | 4/1975 | Welschof et al. | 464/906 X |
| 4,150,553 | 4/1979 | Aucktor | 464/906 X |
| 4,300,651 | 11/1981 | Krude | 464/906 X |
| 4,405,032 | 9/1983 | Welschof et al. | 180/259 |
| 4,424,047 | 1/1984 | Welschof et al. | 308/191 X |
| 4,427,085 | 1/1984 | Aucktor | 308/191 X |

FOREIGN PATENT DOCUMENTS 1480012 10/1964 Fed. Rep. of Germany ........ 180/48
2708416 2/1977 Fed. Rep. of Germany ... 301/124 R Primary Examiner—Robert B. Reeves
Assistant Examiner—Russell D. Stormer
Attorney, Agent, or Firm—Toren, McGeady, Stanger, Goldberg & Kiel

[57] ABSTRACT

An assembly for mounting a wheel on a vehicle including a bearing assembly and a universal joint wherein the outer bearing ring of the bearing assembly is affixed to the wheel carrier and wherein the hub of the wheel, the inner bearing ring of the bearing assembly and the outer joint member of the universal joint are formed as a single unitary part. Grooves formed in the inner and outer joint members have torque transmitting balls engaged therebetween and the grooves extend so as to be undercut-free beginning at one end thereof facing the wheel hub. In accordance with the invention, the grooves of the inner joint member and of the outer joint member are arranged in such a way that the connecting line extends between the center of the radius of curvature and that of the balls with the connecting line together with the axis of rotation of the inner joint member enclosing an angle ω which, in accordance with the arcsin of the projection of the center of the radius of curvature and with the center of the balls, with reference to the vertical plane relative to the axis of rotation of the joint, divided by the length of the radius of curvature, equals or is smaller than 85°.

5 Claims, 1 Drawing Figure

WHEEL MOUNTING ASSEMBLY

The present invention relates generally to a wheel mounting assembly particularly for mounting a wheel on a motor vehicle, and the invention relates more particularly to an assembly which includes a bearing assembly for rotatably mounting the wheel and a rotary constant velocity universal joint for enabling the wheel to be connected in driving engagement with a drive shaft of the assembly.

The type of assembly to which the invention relates is such that the bearing assembly is formed so that the outer bearing ring thereof is fixed to the wheel carrier of the vehicle upon which the wheel is to be mounted. Furthermore, in the type of assembly to which the present invention relates, the hub of the wheel, the inner bearing ring of the bearing assembly and the outer joint member of the universal joint are formed as a single unitary part. Of course, the universal joint is formed with grooves in the inner and outer joint member thereof, the grooves extending so as to be undercut-free and receiving therein in torque transmitting engagement the torque transmitting balls of the universal joint.

Wheel mounting assemblies of the type discussed above are known in the prior art, for example, from U.S. Pat. No. 3,295,626 and German Offenlegungsschrift No. 27 08 416. In these prior art devices, the outer joint member and the inner bearing ring are designed as a single component. However, a disadvantage arises in that the grooves for receiving the balls extend in meridian planes. Such a component is difficult to produce since the type of grooves in the outer joint member can only be manufactured by means of expensive chip-producing forming or cutting operations.

A further disadvantage of prior art devices is that assembly and disassembly of the wheel mountings must be accomplished away from the wheel hub. This means that if for the purposes of replacing one of the components it becomes necessary to remove the drive shaft, this can only be accomplished by removing the entire bearing assembly from the ball heads or by dismantling the wheel bearing itself. Both operations are difficult and expensive.

The present invention is therefore directed toward provision of a wheel mounting assembly of the type described above wherein the drive shaft for the wheel may be assembled and removed from the wheel hub without difficulties. In addition, the invention seeks to provide a wheel mounting assembly which is simpler from a structural point of view and which may be produced with simpler manufacturing techniques in such a manner that the wheel hub together with the inner bearing ring of the bearing assembly of the wheel mounting and the outer joint member of the universal joint may be produced by means of non-cutting or non-chip producing forming operations.

SUMMARY OF THE INVENTION

Briefly, the present invention may be described as a wheel mounting assembly for a wheel having a wheel hub and including a wheel carrier by which the wheel may be operably mounted on a motor vehicle comprising: a bearing assembly comprising an inner bearing ring and an outer bearing ring rotatably mounting the wheel relative to the wheel carrier with the outer bearing ring being affixed to the wheel carrier; a universal joint including an inner and an outer joint member for connecting the wheel hub in driving engagement with a drive shaft; said wheel hub, said inner bearing ring and said outer joint member being formed as a single unitary part; grooves formed in said inner and outer joint member having torque transmitting balls engaged therebetween, said grooves extending so as to be undercut-free beginning at one end thereof facing said wheel hub; a supporting element located opposite said one end of said grooves supporting said torque transmitting balls in said grooves; with the grooves in said inner and outer joint members being arranged in such a way that the connecting line extending between the center of the radius of curvature of the grooves and the center of the balls encloses, together with the axis of rotation of the respective joint member in which said grooves are formed an angle $\omega$ which equals or is smaller than 85°.

Thus, in accordance with the invention, the objectives thereof are achieved in that the grooves of the universal joint members are undercut-free beginning at the end thereof facing the wheel hub and that the balls in the joint interior are supported by a supporting element which is arranged at the jaw-like opening formed by the undercut-free grooves, with the curved grooves of the inner joint member and the grooves of the outer joint member being arranged in the manner described above. That is, as indicated above, the grooves of the universal joint are arranged so that the connecting lines $L_R$, $L_r$ extending between the center of the radius of curvature $C_R$, $C_r$ of the grooves 3, 8 and the centers of the balls $C_B$ encloses together with the axis of rotation A of the respective joint member within which the grooves are formed an angle $\omega$ which equals or is smaller than 85°.

The objective of this measure is to ensure that after removal of the brake disc and wheel, the sealing cap can be dismantled together with the securing ring so that subsequently there will be sufficient space for removing the drive shaft at the wheel hub end through the outer joint member. the drive shaft can be pulled through toward the outside of the wheel assembly so that worn parts of the drive shaft can be replaced quickly and inexpensively.

A further advantage of the invention consists in the fact that the inner bearing ring and the outer joint member can be produced as a single component and that as a result of the formation of the grooves in the outer joint member so as to be undercut-free, a non-chip-producing or non-cutting formation production process such as cold extrusion, hot forming or the like may be utilized thereby ensuring economical production techniques. Inasmuch as the end facing the wheel hub is undercut-free, dismantling at the wheel end becomes possible because after removal of the sealing cap and the supporting element, it is the balls which will first fall out of the joint so that subsequently, the inner joint member together with the shaft may also be pulled out at the wheel end.

In accordance with a further feature of the invention, the opening of the wheel hub is provided with a sealing cap which serves to support the supporting element so that the supporting element will be guided.

The advantage of using a sealing cap is that the actual opening in the inner bearing ring may be kept very large as the supporting element cooperates with the sealing cap and is able to roll thereupon when the joint effects angular movement. Additionally, any play resulting from the production process may be compensated for by the sealing cap without requiring special measures.

In accordance with a further essential feature of the invention, the diameter of the opening of the wheel hub is made larger than or equal to the circumscribed circle diameter measured above the track base of the grooves of the outer joint member, and in the center of the supporting element provision is made for a bore which is smaller than the smallest diameter of the shaft.

In order to ensure access to the joint and to the drive shaft at any time, in accordance with an advantageous embodiment of the invention, the sealing cap is firmly and fixedly connected with the wheel hub and is affixed thereto by securing means.

In accordance with a further feature of the invention, a securing ring is provided as the securing means and is arranged in a recess of the inner bearing ring and the wheel hub.

In a further embodiment, the opening is undercut-free.

Additionally, provision is made for the drive shaft to be connected to the joint interior in such a way that it cannot be unfastened.

The various features of novelty which characterize the invention are pointed out with particularity in the claims annexed to and forming a part of this disclosure. For a better understanding of the invention, its operating advantages and specific objects attained by its use, reference should be had to the accompanying drawing and descriptive matter in which there is illustrated and described a preferred embodiment of the invention.

DETAILED DESCRIPTION OF THE PREFERRED EMBODIMENT

Figure 1:
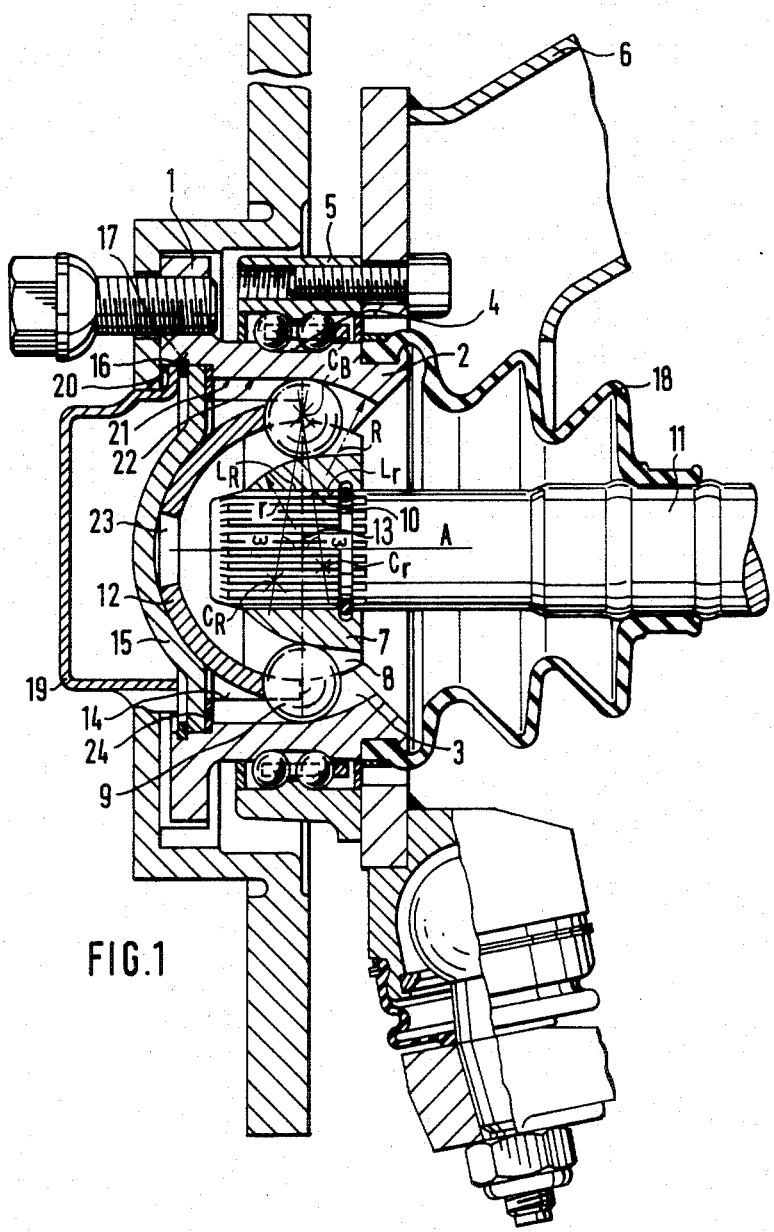
FIG. 1 is a cross-sectional view showing the wheel mounting assembly in accordance with the present invention.

In the drawing, the wheel mounting assembly in accordance with the invention is shown as comprising a mounting whereby the wheel is arranged in rotative engagement on a motor vehicle. The wheel mounting assembly includes a rotary constant velocity universal joint which comprises inner and outer joint members, to be further described hereinafter, which have torque transmitting balls 9 engaged in torque transmitting relationship therebetween.

The wheel mounting assembly also includes a bearing assembly whereby the wheel may be rotatably mounted on a vehicle.

As illustrated in FIG. 1, the assembly includes a wheel hub or flange 1 at whose ends the wheel or break disc is fixed. The wheel hub 1 is designed in such a manner that it includes a projection 2 which essentially operates both as the outer joint member of the universal joint and as the inner bearing ring of the bearing assembly.

Thus, it will be seen that the wheel hub 1 with its projection 2 comprises a single unitary member which constitutes the wheel hub of the assembly, the inner bearing ring of the bearing assembly and the outer joint member of the universal joint.

The outer joint member of the universal joint assembly formed by the projection 2 is formed with grooves 3 which are adapted to cooperate with grooves 8 of an inner joint member 7 in order to receive therein the torque transmitting balls 9.

Additionally, the projection 2 is also formed to act as the inner bearing ring of a bearing assembly which includes an outer bearing ring member 5. The inner bearing ring formed by the projection 2 comprises grooves 4 for receiving therein rolling members which are also held in engagement with the outer bearing ring 5.

The wheel bearing assembly is connected with a wheel carrier 6 by means of the outer ring 5 which is affixed to the carrier 6.

The inner joint member 7 of the universal joint assembly is formed with a bore 10 which, through splines, cooperate with a drive shaft 11 and is arranged in driving engagement therewith. At the end where the grooves 3 and 8 of the universal joint assembly form a jaw-like opening, provision has been made for a supporting element 12 which prevents the balls 9 from leaving the angle bisecting plane 13 during operation of the joint.

An opening 14 of the inner bearing ring is closed by a sealing cap 15 and simultaneously serves to support the supporting element 12. The sealing cap 15 is secured by a securing ring 16 which is received in a recess 17 of the inner bearing ring.

The sealing of the joint is ensured by a boot 18 at one end and by a cap 19 at the other end.

As previously indicated, it is the object of the invention to provide a bearing assembly in such a manner that the drive shaft may be assembled or removed without difficulty from the wheel hub end. Additionally, the invention is intended to simplify the wheel hub together with the inner bearing ring and the outer joint member from a production point of view in such a manner that it is possible to apply production processes which do not involve chip formation.

This objective is achieved in that the grooves 3 and 8 begin to be undercut-feee at the end facing the wheel hub 1. Thus, the grooves in the outer joint member have a constant or decreasing distance from the axis of the outer joint member taken left to right as viewed in FIG. 1, and the grooves of the inner joint member 7 have a constant or increasing distance from the axis of said inner joint member taken left to right as viewed in FIG. 1. Therefore, the grooves in he outer joint member extend from the ends thereof facing the wheel hub without increase in the distance thereof from the axis of the outer joint member and the grooves in the inner joint member extend from the ends thereof facing the wheel hub without increase in the distance thereof from the axis of the inner joint member. The balls 9 in the joint interior are supported by the supporting element 12 arranged at the jaw-like opening 14 formed between the undercut-free grooves 3, 8 with the curved grooves 8 of the inner joint member 7 and the grooves 3 of the outer joint member being arranged in such a way that the connecting line $L_R$, $L_r$ which extends between the center of the radius of curvature $C_R$, $C_r$ of the grooves and the center of the ball 9 encloses together with the axis of rotation A of the respective joint member within which the groove is formed an angle $\omega$ which equals or is smaller than 85°.

The assembly is also provided with an opening 20 in the wheel hub 1 wherein provision is made for the sealing cap 15 which serves to support the supporting element 12 so that the supporting element 12 is guided.

The diameter of the opening 20 of the wheel 1 is larger than or equal to a circumscribed circle diameter 21 measured above a track base 22 of the grooves 3 of the outer joint member and in the center of the supporting element 12 provision is made for a bore 23 which is smaller than the smallest diameter of the shaft 11.

The assembly also includes a seal 24.

The opening 14 within which the supporting element 12 is arranged is undercut-free.

Also, the drive shaft 11 is connected to the joint interior in such a way that it cannot be unfastened.

While a specific embodiment of the invention has been shown and described in detail to illustrate the application of the inventive principles, it will be understood that the invention may be embodied otherwise without departing from such principles.

What is claimed is:

1. A wheel mounting assembly for a wheel having a wheel hub including a wheel carrier by which said wheel may be operatively mounted on a motor vehicle comprising:

a bearing assembly comprising an inner bearing ring and an outer bearing ring rotatably mounting said wheel relative to said wheel carrir with said outer bearing ring being affixed to said wheel carrier;

a universal joint including an inner and an outer joint member each defining an axis of rotation for connecting said wheel hub in driving engagement with a drive shaft;

said wheel hub, said inner bearing ring and said outer joint member being formed as a single unitary part;

grooves formed in said inner and said outer joint member having torque transmitting balls engaged therebetween, said grooves being formed so that said grooves in said outer joint memver extend from an end thereof facing said wheel hub without increase in the distance thereof from the axis of rotation of said outer joint member, and said grooves in said inner joint member extend from an end thereof from the axis of rotation of said inner joint member;

a supporting element located oppoiste said one end of said grooves supporting said torque transmitting balls in said grooves;

with said grooves of said inner joint member and of said outer joint member being arranged in such a way that a connecting line extending between the center of the radius of curvature of said grooves and the center of said balls encloses together with the axis of rotation of the respective joint member in which said grooves are formed an angle $\omega$ which equals or is smaller than 85°.

2. A wheel assembly according to claim 1 wherein said wheel hub is formed with an opening having a sealing cap which serves to support said supporting element and which is in sliding contact with said supporting element.

3. A wheel assembly according to claim 2 wherein the diameter of said opening in said wheel hub is larger than or equal to the diameter of an imaginary circumscribed circle extending through a track base of each of the grooves of said outer joint member at the ends thereof facing said wheel hub and wherein in the center of said supporting element there is provided a bore which is smaller than the smallest diameter of said drive shaft.

4. A wheel assembly according to claim 2 wherein said sealing cap is firmly and fixedly connected with said wheel hub by securing means.

5. A wheel assembly according to claim 4 wherein as said securing means there is provided a securing ring arranged in a recess of said inner bearing ring or said wheel hub.

* * * * *